(12) United States Patent
Tang

(10) Patent No.: US 10,944,625 B2
(45) Date of Patent: Mar. 9, 2021

(54) BEARER CONFIGURATION METHOD AND RELATED PRODUCTS

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 4 days.

(21) Appl. No.: 16/464,053

(22) PCT Filed: Nov. 10, 2017

(86) PCT No.: PCT/CN2017/110555
§ 371 (c)(1),
(2) Date: May 24, 2019

(87) PCT Pub. No.: WO2019/090728
PCT Pub. Date: May 16, 2019

(65) Prior Publication Data
US 2019/0386872 A1   Dec. 19, 2019

(51) Int. Cl.
*H04W 72/12* (2009.01)
*H04L 12/24* (2006.01)
*H04W 88/06* (2009.01)

(52) U.S. Cl.
CPC ............. *H04L 41/08* (2013.01); *H04W 72/12* (2013.01); *H04W 88/06* (2013.01)

(58) Field of Classification Search
CPC .............................. H04L 41/08; H04W 72/12
See application file for complete search history.

(56) References Cited

U.S. PATENT DOCUMENTS

2015/0264562 A1* 9/2015 Wu ................. H04W 12/04
                                                   380/270
2018/0324644 A1* 11/2018 Koskinen .......... H04W 28/0278
(Continued)

FOREIGN PATENT DOCUMENTS

CN         104581681 A      4/2015
WO      2014161162 A1     10/2014
(Continued)

OTHER PUBLICATIONS

3GPP TSG-RAIN WG2 #99bis    R2-1710756 Prague, Czech Republic, Oct. 9-13, 2017 Source: Huawei, HiSilicon Title: "Details of bitmap design"; France, vol. RAN WG2; pp. 2 (Year: 2017).*
(Continued)

*Primary Examiner* — Fahmida S Chowdhury

(57) ABSTRACT

A bearer configuration method and related products are disclosed. The method comprises: a first network device configures a bearer sequence number for at least one first bearer of a terminal, wherein the first bearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

18 Claims, 6 Drawing Sheets

(56) References Cited

U.S. PATENT DOCUMENTS

2019/0098621 A1* 3/2019 Hong ............... H04W 72/1284
2020/0037151 A1* 1/2020 Du ............................ H04L 1/22

FOREIGN PATENT DOCUMENTS

WO 2014181152 A1 11/2014
WO 2016005002 A1 1/2016

OTHER PUBLICATIONS

3GPP TSG-RAN WG2 #99bis; R2-1710756; Prague, Czech Republic, Oct. 9-13, 2017.
3GPP TSG-RAN WG2 Meeting #99bis; R2-1710326; Prague, Czech Republic, Oct. 9-13, 2017.
3GPP TSG RAN WQ3#Ad-hoc; R3-172055; Qingdao, China, Jun. 27-29, 2017 (Revision of R3-171653).
European Search Report dated Nov. 27, 2019 from International Application No. PCT/CN2017/110555.
3GPP TSG SA Meeting #76; TD SP-170487; Jun. 7-9, 2017, West Palm Beach, Florida, USA.
English translation of CN First OA for application No. 201780050611.9 dated Apr. 29, 2020.
EP Examination for EP 17931226.9 dated May 7, 2020.
Communication pursuant to Article 94(3) Examination for EP Application 17931226.9 dated Oct. 16, 2020.

* cited by examiner

First network device

201. Configure a bearer sequence number for at least one first bearer of a terminal

BEARER CONFIGURATION METHOD AND RELATED PRODUCTS

CROSS-REFERENCE TO RELATED APPLICATION(S)

This application is a 371 application of International Application No. PCT/CN2017/110555, filed on Nov. 10, 2017, the entire disclosure of which is hereby incorporated by reference.

TECHNICAL FIELD

The present application relates to the field of communication technologies, and in particular, to a bearer configuration method and related products.

BACKGROUND

In a heterogeneous wireless system, when different types of base stations perform cooperated networking, due to limited bandwidth resources and coverage of a single base station, wireless resources of multiple cells or base stations are concentrated to provide services for users, which is easier to meet capacity and coverage requirements of users. This mode is generally called multi-connectivity. In a Long Term Evolution (LTE) network system, multi-connectivity modes commonly used, include Carrier Aggregation (CA), Coordinated Multiple Points (CoMP) and Dual Connectivity (DC).

Under a DC transmission mode, a protocol architecture of a data duplication transmission mode is shown in FIG. 1A. The protocol architecture is a protocol architecture of a split bearer. For an uplink and a downlink, a Packet Data Convergence Protocol (PDCP) entity is located at a certain serving Cell Group (CG) base station (such as, a Master Cell Group (MCG) base station controlled by a master base station or a Secondary Cell Group (SCG) base station controlled by a secondary base station). A PDCP entity duplicates a PDCP Protocol Data Unit (PDU) into two same duplications, for example, one is a PDCP PDU and the other is a Duplicated PDCP PDU. These two PDCP PDUs pass through Radio Link Control (RLC) layer entities and Medium Access Control (MAC) layer entities of different CG base stations, then respectively reach a corresponding MAC layer entity and RLC layer entity of a terminal (downlink) or a base station (uplink) through air interfaces, and finally converge to a PDCP layer entity. When monitoring that these two PDCP PDUs are of a same version, the PDCP layer entity discards one of the two PDCP PDUs, and delivers the other one to a higher layer entity. A bearer connected with two RLC entities and MAC entities is called a split bearer, if the PDCP entity is located in the MCG base station, the bearer is a MCG Split Bearer, and if the PDCP entity is located in the SCG base station, the bearer is a SCG Split Bearer.

SUMMARY

Implementations of the present application provide a bearer configuration method and related products, which are beneficial for improving consistency of scheduling bearers between a network device and a terminal in a dual connectivity transmission system supporting a data duplication function.

In a first aspect, an implementation of the present application provides a bearer configuration method. The method includes: a first network device configures a bearer sequence number for at least one first bearer of a terminal, wherein the at least one first bearer and at least one second bearer configured by the first network device for the terminal support a data duplication function. The first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

In a second aspect, an implementation of the present application provides a bearer configuration method, includes: a terminal receives configuration information from a first network device, and the configuration information is used for indicating a bearer sequence number configured by the first network device for at least one first bearer. The at least one first bearer and at least one second bearer configured by the first network device for the terminal support a data duplication function. The first network device and the second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

In a third aspect, an implementation of the present application provides a network device. The network device has functions implementing acts of the first network device designed in the foregoing method. The functions may be implemented by using hardware, or may be implemented by executing corresponding software through hardware. The hardware or software includes one or more modules corresponding to the foregoing functions. In a possible design, the network device includes a processor. The processor is configured to support the network device to perform corresponding functions in the foregoing method. Moreover, the network device may further include a transceiver. The transceiver is used for supporting communication between a terminal and the network device. The network device may further include a memory. The memory is used for coupling to the processor, and storing essential program instructions and data of the network device.

In a fourth aspect, an implementation of the present application provides a terminal. The terminal has functions of implementing acts of the terminal designed in the foregoing method. The functions may be implemented by using hardware, or may be implemented by executing corresponding software through hardware. The hardware or software includes one or more modules corresponding to the foregoing functions. In a possible design, the terminal includes a processor. The processor is configured to support the terminal to perform corresponding functions in the foregoing method. Moreover, the terminal may further include a transceiver. The transceiver is used for supporting communication between the terminal and a network device. The terminal may further include a memory. The memory is used for coupling to the processor, and storing essential program instructions and data of the terminal.

In a fifth aspect, an implementation of the present application provides a network device. The network device includes a processor, a memory, a transceiver, and one or more programs, wherein the one or more programs are stored in the memory and configured to be executed by the processor, and the program includes instructions for executing acts in any method of the first aspect in the implementation of the present application.

In a sixth aspect, an implementation of the present application provides a terminal. The terminal includes a processor, a memory, a communication interface, and one or more programs, wherein the one or more programs are stored in the memory and configured to be executed by the processor, and the program includes instructions for executing acts in any method of the second aspect in the implementation of the present application.

In a seventh aspect, an implementation of the present application further provides a computer-readable storage medium. The computer-readable storage medium stores computer programs for electronic data interchange. The computer programs enable a computer to execute all or part of acts as described in any method of the first aspect in the implementation of the present application.

In an eighth aspect, an implementation of the present application further provides a computer-readable storage medium. The computer-readable storage medium stores computer programs for electronic data interchange. The computer programs enable a computer to execute all or part of acts as described in any method of the second aspect in the implementation of the present application.

In a ninth aspect, an implementation of the present application further provides a computer program product. The computer program product includes a non-transitory computer-readable medium storing computer programs. The computer programs are operable to enable a computer to execute all or part of acts as described in any method of the first aspect in the implementations of the present application. The computer program product may be a software installation package.

In a tenth aspect, an implementation of the present application further provides a computer program product. The computer program product includes a non-transitory computer-readable medium storing computer programs. The computer programs are operable to enable a computer to execute all or part of acts as described in any method of the second aspect in the implementation of the present application. The computer program product may be a software installation package.

BRIEF DESCRIPTION OF DRAWINGS

The following briefly illustrates accompanying drawings which are required for describing implementations or the prior art.

DETAILED DESCRIPTION

The following describes technical solutions in implementations of the present application with reference to the accompanying drawings.

Figure 1A:
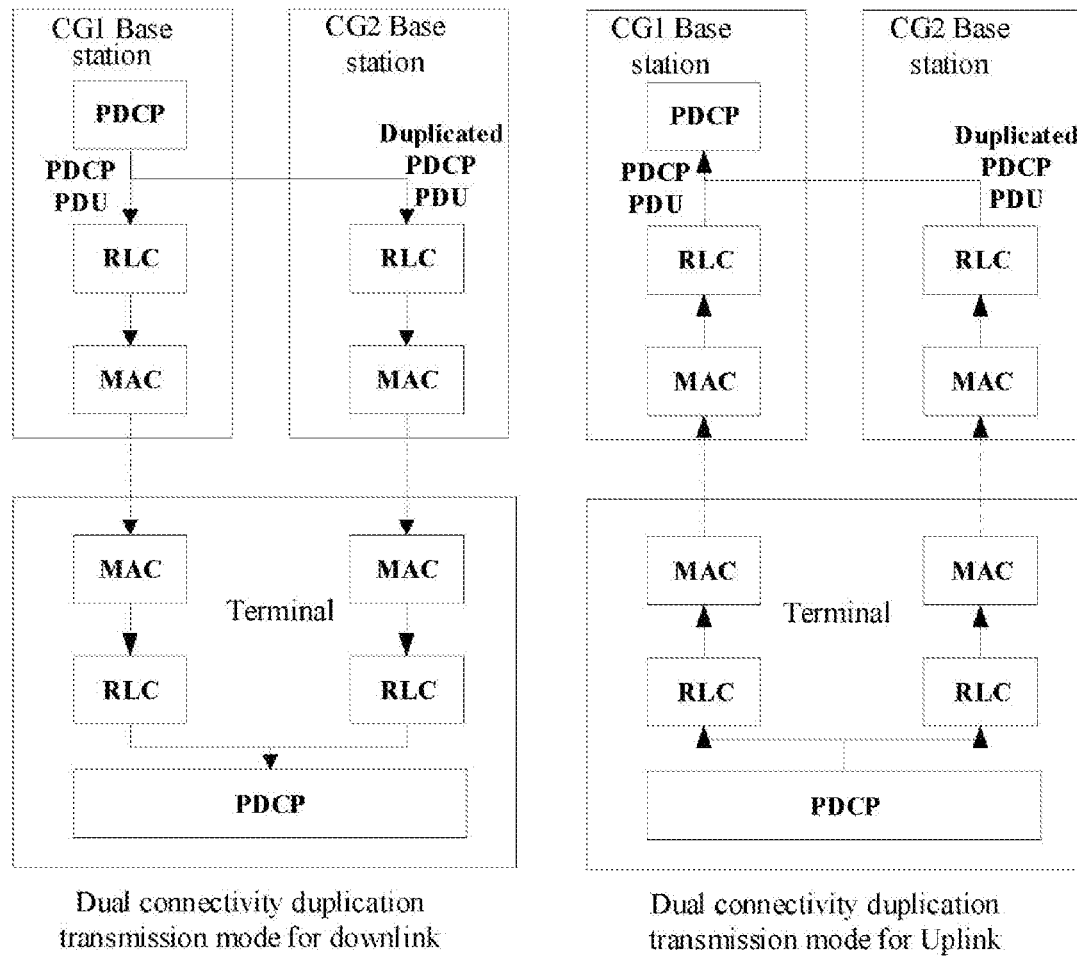
FIG. 1A is an example of a protocol architecture of a dual connectivity transmission mode supporting a data duplication function according to an implementation of the present application.
Figures 1B, 2A:
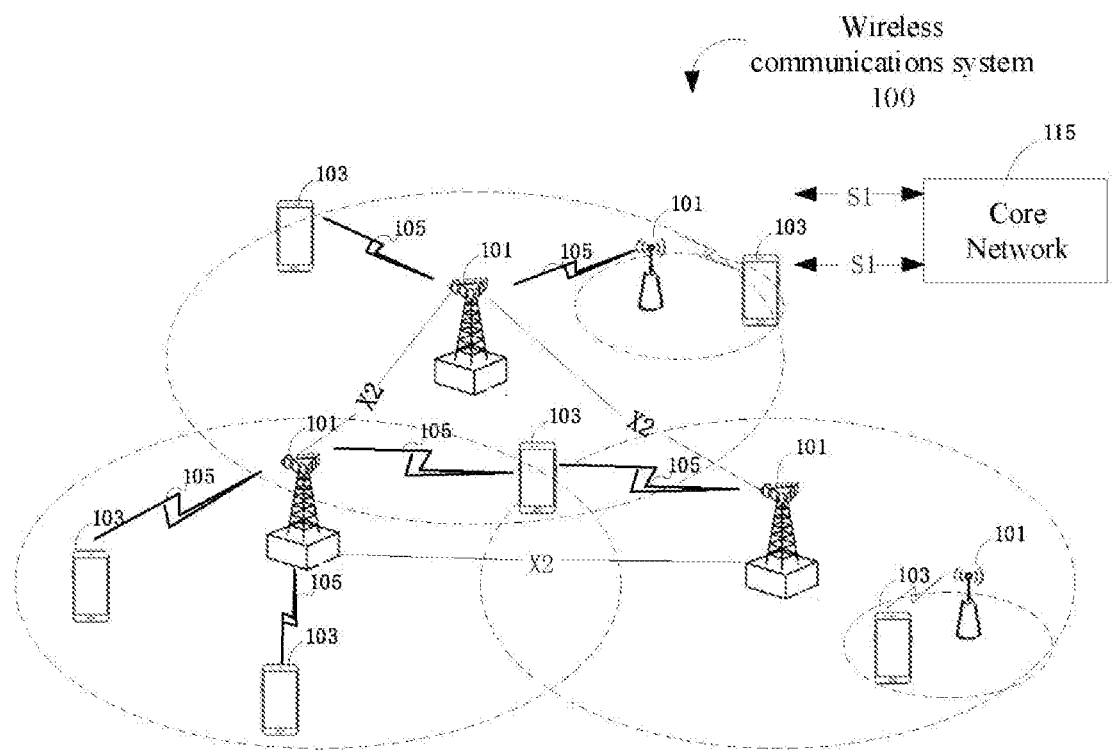
FIG. 1B is a diagram of a network architecture of a possible communication system according to an implementation of the present application.
FIG. 2A is a schematic flowchart of a bearer configuration method according to an implementation of the present application.

FIG. 1B shows a wireless communication system according to the present application. The wireless communication system may work on a high frequency band, and the wireless communication system is not limited to a Long Term Evolution (LTE) system, it also may be a 5th Generation (5G) mobile communication system evolved in the further, a New Radio (NR) system, a Machine to Machine (M2M) system, or the like. As shown in FIG. 1B, a wireless communication system 100 may include one or more network devices 101, one or more terminals 103, and a core network 115.

The network device 101 may be a base station. The base station may be used for communicating with one or more terminals, or may be used for communicating with one or more base stations with partial terminal functions (such as communication between a macro base station and a micro base station, e.g., an access point). The base station may be a Base Transceiver Station (BTS) in a Time Division Synchronous Code Division Multiple Access (TD-SCDMA) system, an Evolutional Node B (eNB) in an LTE system, and a base station in a 5G system or a NR system. In addition, the base station may be an Access Point (AP), a transport node (Trans TRP), a Central Unit (CU), or other network entities, and may include some or all of functions of the above network entities.

The terminal 103 may be distributed throughout the overall wireless communication system 100, which may be static or mobile. In some implementations of the present application, the terminal 103 may be a mobile device, a mobile station, a mobile unit, an M2M terminal, a wireless unit, a remote unit, a user agent, a mobile client or the like.

Specifically, the network device 101 may be used for communicating with the terminal 103 through a wireless interface 105 under the control of a network device controller (not shown). In some implementations, the network device controller may be a part of the core network 115 or may be integrated into the network device 101. Specifically, the network device 101 may be used for transmitting control information or user data to the core network 115 through a blackhaul interface 113 (such as an S1 interface). Specifically, a network device 101 may directly or indirectly communicate with another network device 101 through a blackhaul interface 111 (such as an X2 interface).

It should be noted that the wireless communication system 100 shown in FIG. 1B is only for the purpose of more clearly explaining the technical solutions of the present application and does not constitute a limitation to the present application. The person of ordinary skill in the art should know that with the evolution of network architecture and the emergence of new service scenarios, the technical solutions provided by the present application are also applicable to similar technical problems.

Related technologies involved in the present application are described below.

At present, in the 5th-Generation (5G) mobile communication technology and the NR system, a scheme of a carrier aggregation technology supporting data duplication and transmission is proposed to utilize a data duplication function of a Packet Data Convergence Protocol (PDCP) layer entity, which enables duplicated PDCP Protocol Data Units (PDCP PDUs) to be respectively transmitted to two Radio Link Control (RLC) layer entities (the two RLC layer entities respectively have different logical channels), and finally ensures that the duplicated PDCP PDUs can be transmitted on different physical layer aggregated carriers.

However, in a DC scenario, both Master Node (MN) and Slave Node (SN) may send an MAC CE, when a data duplication bearer is established/released, it will affect a format of the MAC CE. If a Master Cell Group (MCG) bearer is in a data duplication mode, there should be a corresponding bit on the MAC CE, otherwise there is no such bit, which is a change of the format of the MAC CE. The problem here is that, since the MCG bearer is independent on the SN, the SN may not know whether the MCG bearer exists or not, thus the SN does not know whether the format of the MAC CE should be changed. Considering that a RRC signaling for bearer establishment/release is sent from the MN to the User Equipment (UE), and the sending of the signaling requires time, how the SN controls the sending of the MAC CE to avoid wrong understanding of the UE is a problem to be solved. The wrong understanding here is as follows:

(1) An RRC signaling for bearer establishment/release sent by an MN to a UE has not been correctly received, an SN has already sent an MAC CE according to a new format.

(2) An RRC signaling for bearer establishment/release sent by the MN to the UE has been correctly received, and the SN still sends an MAC CE according to an old format.

To solve the above problems, the implementations of the present application provide following embodiments, which will be described in detail below with reference to the accompanying drawings.

Referring to FIG. 2A, FIG. 2A is a bearer configuration method according to an implementation of the present application. The method, applied to the above exemplary communication system, includes section 201.

In section 201, a first network device configures a bearer sequence number for at least one first bearer of a terminal. The first bearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

A bearer sequence number of each first bearer belongs to a first sequence number set, a bearer sequence number of each second bearer belongs to a second sequence number set, and a range of the first sequence number set does not coincide with a range of the second sequence number set.

A bit to which a bearer sequence number is mapped refers to a bit in an MAC CE signaling, and the bit is used for indicating whether to activate a corresponding bearer, and a bearer sequence number of each bearer and a quantity of bits to which the bearer sequence number of the each bearer is mapped may be one-to-one correspondence, which is not limited uniquely here.

Figure 2B:
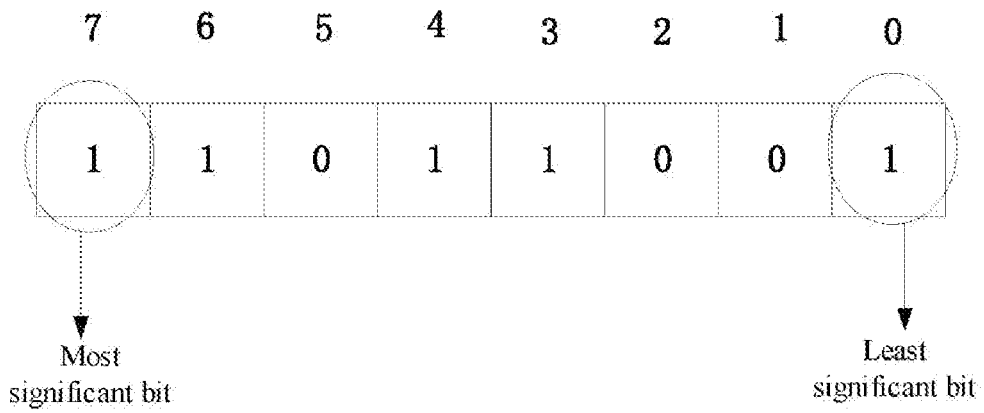
FIG. 2B is a schematic diagram of an example of a least significant bit and a most significant bit according to an implementation of the present application.

In a bit field to which a bearing sequence number is mapped, a most significant bit refers to a highest bit of the bit field, and correspondingly, a least significant bit refers to a lowest bit of the bit field. As shown in FIG. 2B, for a bit field containing 8 bits, the most significant bit is the 7th bit of the bit field (if the bits is counted from 1, the most significant bit corresponds to the 8th bit), and the least significant bit refers to the zeroth bit of the bit field (if the bits is counted from 1, the least significant bit corresponds to the 1st bit).

Figure 2C:
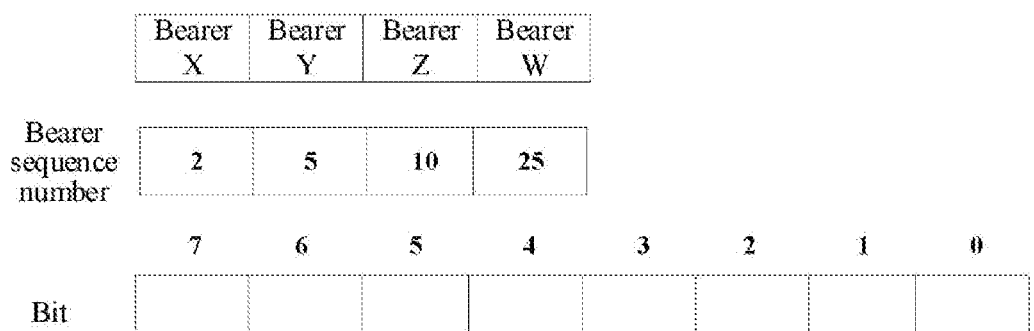
FIG. 2C is a schematic diagram of an example of a mapping relationship between bits and bearer sequence numbers of a first bearer and second bearer according to an implementation of the present application.

For example, assuming that a range of a first sequence number set corresponding to a first bearer is [20, 31], a range of a second sequence number set corresponding to the second bearer is [0, 19], and the second bearer configured by the first network device for the terminal includes a bearer X, a bearer Y and a bearer Z, wherein a bearer sequence number corresponding to the bearer X is 2, a bearer sequence number corresponding to the bearer Y is 5, and a bearer sequence number corresponding to the bearer Z is 10. If the first network device needs to configure a first bearer, which is a bearer W, for the terminal, a bearer sequence number of the bearer W may be configured as 25 in the sequence number range [20, 31]. In this case, as shown in FIG. 2C, bits to which the bearer W, the bearer X, the bearer Y, and the bearer Z may be the 7th bit, the 6th bit, the 5th bit, and the 4th bit respectively.

Figure 2D:
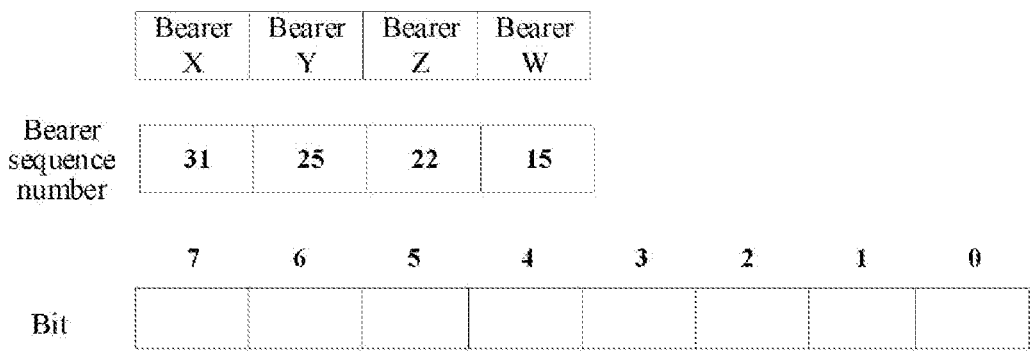
FIG. 2D is an diagram of another example of a mapping relationship between bits and bearer sequence numbers of a first bearer and a second bearer according to an implementation of the present application.

For another example, assuming that a range of a first sequence number set corresponding to a first bearer is [0, 19], a range of a second sequence number set corresponding to a second bearer is [20, 31], and the second bearer configured by the first network device for the terminal includes a bearer X, a bearer Y and a bearer Z, and a bearer sequence number corresponding to the bearer X is 31, a bearer sequence number corresponding to the bearer Y is 25, and a bearer sequence number corresponding to the bearer Z is 22. If the first network device needs to configure a first bearer, which is a bearer W, for the terminal, a bearer sequence number of the bearer W may be configured as 15 in the sequence number range [0, 19]. In this case, as shown in FIG. 2D, bits to which the bearer X, the bearer Y, the bearer Z, and the bearer W may be the 7th bit, the 6th bit, the 5th bit, and the 4th bit respectively.

It can be seen that, in the implementation of the present application, the first network device configures the bearer sequence number for the at least one first bearer of the terminal. Since the first network device and at least one second bearer configured by the network device for the terminal support the data duplication function, the first network device and a second network device provide dual connectivity transmission for the terminal, and a difference between a first bit to which a bearer sequence number of each first bearer is mapped and a most significant bit is greater than a difference between a second bit to which a bearer sequence number of each second bearer is mapped and the most significant bit. That is, regardless of whether the bearer sequence number of the first bearer is less than or greater than the bearer sequence number of the second bearer, the first bit to which the first bearer is mapped is always closer to the least significant bit than that of the second bit to which the second bearer is mapped. As a result, establishment or release of the first bearer will not affect the mapping relationship between the bearer sequence number and the bit of the second bearer, and when the second network device knows a bearing condition of the second bearer but does not know a bearing condition of the first bearer, the second network device may still send an MAC CE according to an original mapping relation between the bearer sequence number and the bit, so as to coordinate scheduling of the second bearer with the terminal, thus it is beneficial for improving the consistency of scheduling bearers between the network device and the terminal in the dual connectivity transmission system supporting the data duplication function.

In a possible example, the at least one first bearer is associated with the first network device, and the at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a (MCG) split bearer, and a SCG split bearer.

Since the first network device configures the bearer sequence numbers of the first bearer and the second bearer, that is, the bearer sequence numbers of all bearers of the terminal are transparent to the first network device. However the first bearer is independent of the second network device, the first network device does not notify the second network device of the bearer condition of the first bearer, therefore the first bearer is invisible to the second network device.

It can be seen that in this example, for the first bearer which is invisible to the second network device, the first network device reasonably configures the bearer sequence number of the first bearer, and makes the first bit to which the bearer sequence number of the first bearer is mapped to be always closer to the least significant bit than that of the second bit to which the bearer sequence number of the second bearer is mapped, that is, to make the corresponding relationship between the bearer sequence number and the bit of the second bearer will not change due to the update of the first bearer, thereby ensuring that the second network device can still accurately schedule the second bearer with the terminal without changing the format of the MAC CE, thus it is beneficial for improving the consistency of the network device and the terminal scheduling the second bearer in the dual connectivity transmission network supporting the data duplication function.

In a possible example, at least one first bit to which at least one first bearer is mapped and at least one second bit to which at least one second bearer is mapped are successive bits.

It can be seen that, in this example, the successive bits may decrease redundant bits and reduce overhead of bits, which is beneficial for improving an efficiency of data transmission.

In a possible example, the method further includes: the first network device notifies the terminal of the bearer sequence number of the at least one first bearer.

In a specific implementation, the first network device may send configuration information to the terminal. The configuration information is used for indicating the bearer sequence number of the at least one first bearer. After obtaining the bearer sequence number of the at least one first bearer, the terminal can determine the bit to which the bearer sequence number of the at least one first bearer is mapped according to a pre-stored mapping relationship between the bearer sequence number and the bit.

It can be seen that, in this example, the first network device can accurately notify the terminal of the bearer sequence number of the first bearer through the configuration information, and the terminal can accurately know the bit to which the first bearer is mapped, thereby improving an efficiency of bearer configuration.

Figure 3:
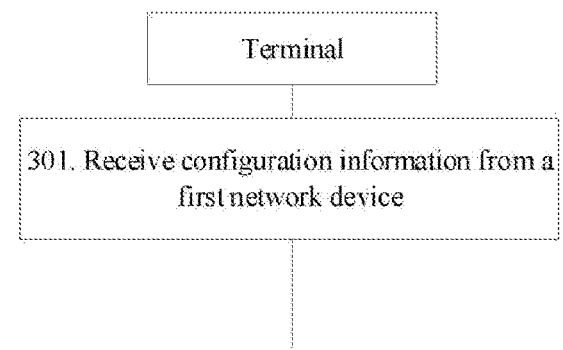
FIG. 3 is a schematic flowchart of a bearer configuration method according to an implementation of the present application.

Referring to FIG. 3 that is corresponding to the implementation shown in FIG. 2A. FIG. 3 is another bearer configuration method according to an implementation of the present application. The method, applied to the above exemplary communication system, includes section 301.

In section 301, a terminal receives configuration information from a first network device. The configuration information is used for indicating a bearer sequence number configured by the first network device configures for at least one first bearer. The first bearer and at least one second bearer configured by the first network device for the terminal support a data duplication function, and the first network device and a second network device provide dual connectivity (DC) transmission for the terminal. A difference between a first bit to which a bearer sequence number of each first bearer is mapped and a most significant bit is greater than a difference between a second bit to which a bearer sequence number of each second bearer is mapped and the most significant bit.

The bearer sequence number of each first bearer belongs to a first sequence number set, the bearer sequence number of each second bearer belongs to a second sequence number set, and a range of the first sequence number set does not coincide with a range of the second sequence number set.

It can be seen that, in the implementation of the present application, the configuration information includes the bearer sequence number configured by the first network device for the at least one first bearer of the terminal. Since the first bearer and the at least one second bearer configured by the first network device for the terminal support the data duplication function, the first network device and a second network device provide dual connectivity transmission for the terminal, and the difference between the first bit to which the bearer sequence number of each first bearer is mapped and a most significant bit is greater than the difference between the second bit to which the bearer sequence number of each second bearer is mapped and the most significant bit. That is, regardless of whether the bearer sequence number of the first bearer is less than or greater than the bearer sequence number of the second bearer, the first bit to which the first bearer is mapped is always closer to the least significant bit than that of the second bit to which the second bearer is mapped. As a result, establishment or release of the first bearer will not affect the mapping relationship between the bearer sequence number and the bit of the second bearer, and when the second network device knows the bearing condition of the second bearer but does not know the bearing condition of the first bearer, the second network device can still send an MAC CE according to an original mapping relation between the bearer sequence number and the bit, so as to coordinate scheduling of the second bearer with the terminal, thus it is beneficial for improving the consistency of scheduling bearers between the network device and the terminal in the dual connectivity transmission system supporting the data duplication function.

In a possible example, the at least one first bearer is associated with the first network device, and the at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a MCG split bearer, and a SCG split bearer.

In a possible example, the at least one first bit to which the at least one first bearer is mapped and the at least one second bit to which the at least one second bearer is mapped are successive bits.

Figure 4:
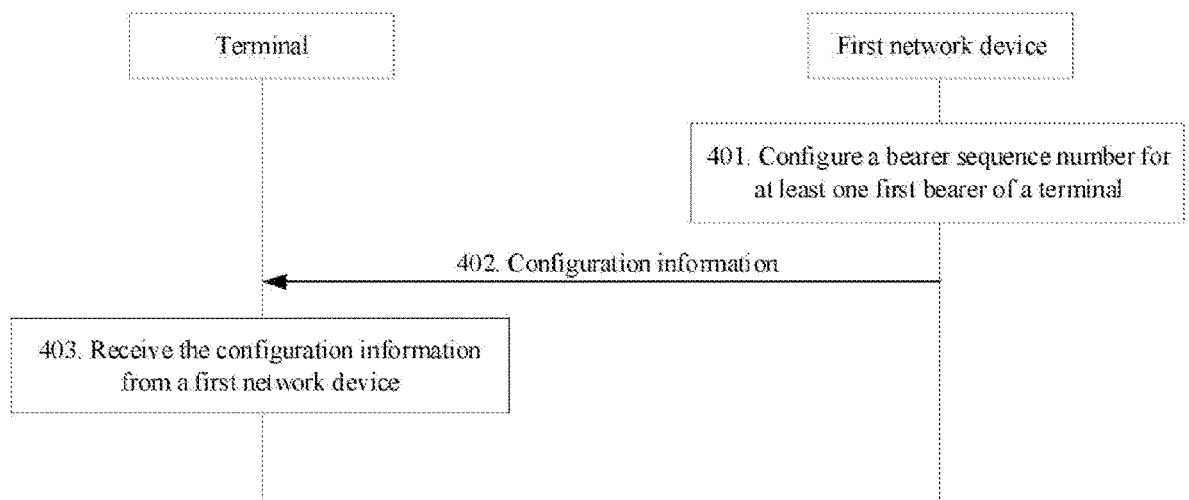
FIG. 4 is a schematic flowchart of a bearer configuration method according to an implementation of the present application.

Referring to FIG. 4 that is corresponding to the implementations shown in FIG. 2A and FIG. 3. FIG. 4 is a bearer configuration method according to an implementation of the present application. The method, applied to the above exemplary communication system, includes section 401-section 403.

In section 401, a first network device configures a bearer sequence number for at least one first bearer of a terminal. The first bearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

In Section 402, the first network device sends configuration information to the terminal.

In Section 403, the terminal receives the configuration information from the first network device, and the configuration information is used for indicating the bearer sequence number configured by the first network device for the at least one first bearer. The first bearer and at least one second bearer configured by the first network device e for the terminal support a data duplication function, the first network device and the second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

It can be seen that, in the implementation of the present application, the first network device configures the bearer sequence number for the at least one first bearer of the terminal. Since the first bearer and the at least one second bearer configured by the first network device for the terminal support a data duplication function, the first network device and the second network device provide dual connectivity transmission for the terminal, and the difference between the first bit to which the bearer sequence number of each first bearer is mapped and the most significant bit is greater than the difference between the second bit to which the bearer sequence number of each second bearer is mapped and the most significant bit. That is, regardless of whether the bearer sequence number of the first bearer is less than or greater than the bearer sequence number of the second bearer, the first bit to which the first bearer is mapped is always closer to the least significant bit than that of the second bit to which the second bearer is mapped. As a result, establishment or release of the first bearer will not affect the mapping relationship between the bearer sequence number and the bit of the second bearer, and when the second network device knows a bearing condition of the second bearer but does not know a bearing condition of the first bearer, the second network device can still send an MAC CE according to an original mapping relation between the bearer sequence number and the bit, so as to coordinate scheduling of the second bearer with the terminal, thus it is beneficial for improving the consistency of scheduling bearers between the network device and the terminal in the dual connectivity transmission system supporting the data duplication function.

Figure 5:
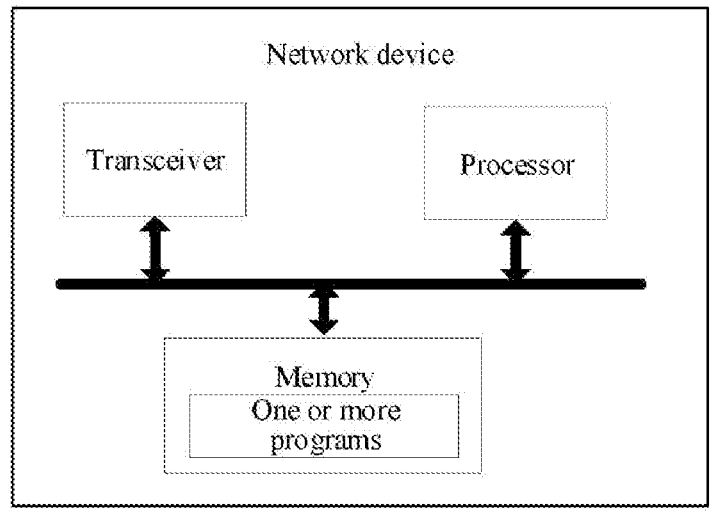
FIG. 5 is a schematic diagram of structure of a network device according to an implementation of the present application.

Referring to FIG. 5 that is corresponding to the above implementation. FIG. 5 is a schematic diagram of structure of a network device according to an implementation of the present application. The network device is a first network device. As shown in FIG. 5, the network device includes: a processor, a memory, a transceiver, and one or more programs. The one or more programs are stored in the memory and configured to be executed by the processor, and the program includes instructions for performing following acts of: configuring a bearer sequence number for at least one first bearer of a terminal, wherein the first nearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

It can be seen that, in the implementation of the present application, the first network device configures the bearer sequence number for the at least one first bearer of the terminal. The first bearer and the at least one second bearer configured by the first network device for the terminal support the data duplication function, the first network device and the second network device provide dual connectivity transmission for the terminal, and the difference between the first bit to which the bearer sequence number of each first bearer is mapped and the most significant bit is greater than the difference between the second bit to which the bearer sequence number of each second bearer is mapped and the most significant bit. That is, regardless of whether the bearer sequence number of the first bearer is less than or greater than the bearer sequence number of the second bearer, the first bit to which the first bearer is mapped is always closer to the least significant bit than that of the second bit to which the second bearer is mapped. As a result, establishment or release of the first bearer will not affect the mapping relationship between the bearer sequence number and the bit of the second bearer, and when the second network device knows a bearing condition of the second bearer but does not know a bearing condition of the first bearer, the second network device can still send an MAC CE according to an original mapping relation between the bearer sequence number and the bit, so as to coordinate scheduling of the second bearer with the terminal, thus it is beneficial for improving the consistency of scheduling bearers between the network device and the terminal in the dual connectivity transmission system supporting the data duplication function.

In a possible example, the at least one first bearer is associated with the first network device, and the at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a MCG split bearer, and a SCG split bearer.

In a possible example, at least one first bit to which the at least one first bearer is mapped and at least one second bit to which the at least one second bearer are successive bits.

In a possible example, the processor further performs an act of: notifying, by the first network device, the terminal of a bearer sequence number of the at least one first bearer.

Figure 6:
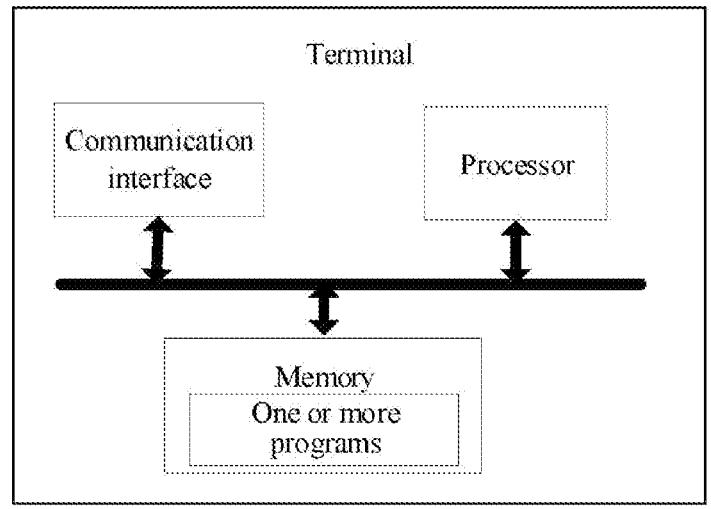
FIG. 6 is a schematic diagram of structure of a terminal according to an implementation of the present application.

Referring to FIG. 6 that is corresponding to the above implementation. FIG. 6 is a schematic diagram of structure of a terminal according to an implementation of the present application. As shown in FIG. 6, the terminal includes: a processor, a memory, a communication interface, and one or more programs. The one or more programs are stored in the memory and configured to be executed by the processor, and the program includes instructions for performing the following acts of: receiving configuration information from a first network device, and the configuration information is used for indicating a bearer sequence number configured by the first network device for at least one first bearer. The first bearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

It can be seen that, in the implementation of the present application, the configuration information includes the bearer sequence number configured by the first network device for the at least one first bearer of the terminal. Since the first beater and the at least one second bearer configured by the first network device for the terminal support the data duplication function, the first network device and a second network device provide dual connectivity transmission for the terminal, and the difference between the first bit to which the bearer sequence number of each first bearer is mapped and the most significant bit is greater than the difference between the second bit to which the bearer sequence number of each second bearer is mapped and the most significant bit. That is, regardless of whether the bearer sequence number of the first bearer is less than or greater than the bearer sequence number of the second bearer, the first bit to which the first bearer is mapped is always closer to the least significant bit than the second bit to which the second bearer is mapped. As a result, establishment or release of the first bearer will not affect the mapping relationship between the bearer sequence number and the bit of the second bearer, and when the second network device knows a bearing condition of the second bearer but does not know a bearing condition of the first bearer, the second network device can still send an MAC CE according to an original mapping relation between the bearer sequence number and the bit, so as to coordinate scheduling of the second bearer with the terminal, thus it is beneficial for improving the consistency of scheduling bearers between the network device and the terminal in the dual connectivity transmission system supporting the data duplication function.

In a possible example, the at least one first bearer is associated with the first network device, and the at least one at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a MCG split bearer, and a SCG split bearer.

In a possible example, at least one first bit to which the at least one first bearer is mapped and at least one second bit to which the at least one second bearer is mapped are successive bits.

The foregoing describes the solutions provided in the implementations of the present application mainly from a perspective of interaction between network elements. It can be understood that the terminal and the network device include corresponding hardware structures and/or software modules for performing the various functions, so as to implement the foregoing functions. A person skilled in the art should easily understand that, in combination with units and algorithm steps in examples described with reference to the implementations disclosed herein, the present application may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such an implementation goes beyond the scope of the present application.

Division for functional units can be performed for the terminal and network device in the implementations of the present application according to the above method examples. For example, various functional units may be divided according to various functions, or two or more functions can be integrated into one processing unit. The aforementioned integrated unit may be implemented in a form of hardware, or may be implemented in a form of a software program module. It should be noted that, the division of the units in the implementations of the present application is illustrative, and is merely the division of logical functions. Other division modes may be used in actual implementations.

Figure 7:
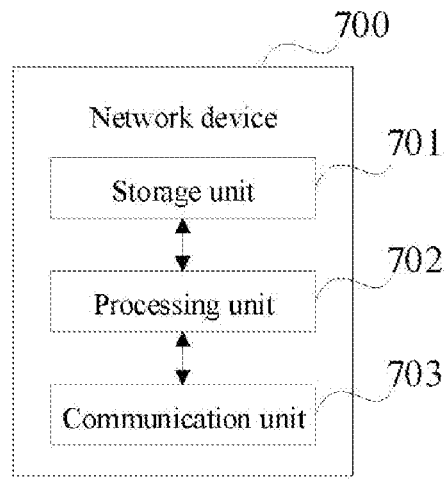
FIG. 7 is a schematic diagram of structure of a network device according to an implementation of the present application.

In a case that an integrated unit is used, FIG. 7 illustrates a block diagram of possible composition of functional units of a network device related to the above implementations. The network device is a first network device. A network device 700 includes a processing unit 702 and a communication unit 703. The processing unit 702 is used for controlling and managing acts of a terminal. For example, the processing unit 702 is used for supporting the network device to perform sections 201-202 in FIG. 2A, sections 402 and 403 in FIG. 4, and/or other processes of the techniques described in the present application. The communication unit 703 is used for supporting communication between the network device and other devices, such as communication between the terminal and network device as shown in FIG. 6. The network device further includes a storage unit 701 used for storing program codes and data of the network device.

The processing unit 702 may be a processor or a controller, the communication unit 703 may be a transceiver, a transceiving circuit, or a radio frequency chip, and storage unit 701 may be a memory.

The processing unit 702 is used for configuring a bearer sequence number for at least one first bearer of the terminal, wherein the first bearer and at least one second bearer configured by the first network device for the terminal support a data duplication function, the first network device and a second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

In a possible example, the at least one first bearer is associated with the first network device, and the at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a MCG split bearer, and a SCG split bearer.

In a possible example, at least one first bit to which the at least one first bearer is mapped and at least one second bit to which the at least one second bearer is mapped are successive bits.

In a possible example, the processing unit 702 is further used for notifying the terminal of the bearer sequence number of the at least one first bearer through the communication unit 703.

When the processing unit 702 is a processor, the communication unit 703 is a communication interface, and the storage unit 701 is a memory, the network device related to implementation of the present application may the network device shown in FIG. 5.

Figure 8:
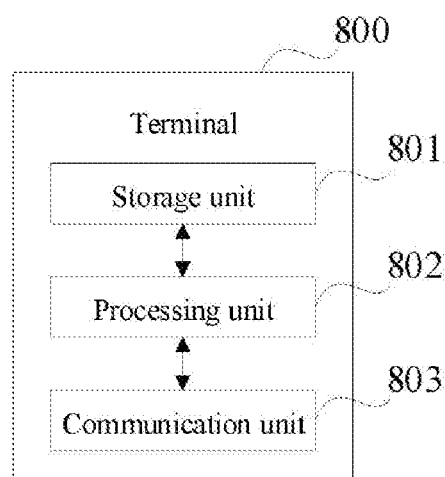
FIG. 8 is a schematic diagram of structure of a terminal according to an implementation of the present application.

In the case that an integrated unit is used, FIG. 8 illustrates a block diagram of possible composition of possible functional units of a terminal related to the above implementations. A terminal 800 includes a processing unit 802 and a communication unit 803. The processing unit 802 is used for controlling and managing acts of the terminal. For example, the processing unit 802 is used for supporting the terminal to perform sections 202-205 in FIG. 2A, sections 402-406 in FIG. 4, and/or other processes of the techniques described herein. The communication unit 803 is used for supporting communication between the terminal and other devices, such as communication between the terminal and network device as illustrated in FIG. 5. The terminal further includes a storage unit 801 used for storing program codes and data of the terminal.

The processing unit 802 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, a transistor logic device, a hardware component, or any combination thereof. The various illustrative logical blocks, modules, and circuits described in connection with the disclosure of the application may be implemented. The processor may be a combination for implementing computing functions, for example, the combination may be a combination containing one or more microprocessors, a combination containing a DSP and a microprocessor, a combination of one or more, or any other such configuration, or the like. The communication unit 803 may be a transceiver or a transceiving circuit, or the like. The storage unit 801 may be a memory.

The processing unit 802 is used for receiving, configuration information from a first network device through the communication unit 803, and the configuration information is used for indicating a bearer sequence number configured by the first network device for at least one first bearer. The first bearer and at least one second bearer configured by the first network device for the terminal support a data duplication function, the first network device and the second network device provide dual connectivity (DC) transmission for the terminal, and a difference between a first bit to which a bearer sequence number of each first bearer is mapped and a most significant bit is greater than a difference between a second bit to which a bearer sequence number of each second bearer is mapped and the most significant bit.

In a possible example, the at least one first bearer is associated with the first network device, and the at least one second bearer is associated with the first network device and the second network device.

In a possible example, the at least one first bearer includes a Master Cell Group (MCG) bearer.

In a possible example, the at least one second bearer includes at least one of: a Secondary Cell Group (SCG) bearer, a MCG split bearer, and a SCG split bearer.

In a possible example, at least one first bit to which the at least one first bearer is mapped and at least one second bit to which the at least one second bearer is mapped are successive bits.

When the processing unit 802 is a processor, the communication unit 803 is a communications interface, and the storage unit 801 is a memory. The terminal related to implementations of the present application may the terminal shown in FIG. 6.

An implementation of the present application further provides a computer-readable storage medium. The computer-readable storage medium stores computer programs for electronic data interchange. The computer programs enable a computer to execute all or parts of acts which are performed by the terminal as described in the above method implementations.

An implementation of the present application further provides a computer-readable storage medium. The computer-readable storage medium stores computer programs for electronic data interchange. The computer programs enable a computer to execute all or parts of acts which are performed by the network device as described in the above method implementations.

An implementation of the present disclosure also provides a computer program product. The computer program product includes a non-transitory computer-readable medium storing computer programs. The computer programs are operated to enable a computer to execute all or parts of acts which are performed by the terminal as described in the above method implementations. The computer program product may be a software installation package.

An implementation of the present disclosure also provides a computer program product. The computer program product includes a non-transitory computer-readable medium storing computer programs. The computer programs are operated to enable a computer to execute all or parts of acts that are performed by the network device as described in the above methods. The computer program product may be a software installation package.

The acts of the method or algorithm described in implementations of the present application may be implemented in hardware, or implemented in a manner of executing software instructions by a processor. The software instructions may be composed by corresponding software modules. The software modules may be stored in a Random Access Memory (RAM), a flash memory, a Read-Only Memory (ROM), an Erasable Programmable Read-Only Memory (EPROM), an Electrically Erasable Programmable Read-Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from the storage medium, and write information to the storage medium. Of course, the storage medium may be a component of the processor. The processor and the storage medium may be located in an ASIC. In addition, the ASIC may be located in an access network device, a target network device or a core network device. Of course, the processor and the storage medium may be located as discrete components in an access network device, a target network device or a core network device.

Those skilled in the art should realize that, in the one or more examples described above, the functions described in implementations of the present application may be implemented, in whole or in parts, via software, hardware, firmware or any combination thereof. When implemented in software, the functions may be implemented, in whole or in part, in the form of a computer program product. The computer program product includes one or more computer instructions. When the computer program instructions are loaded and executed on a computer, the flows or functions described in accordance with implementations of the present application are generated in whole or in part. The computer may be a general purpose computer, a special purpose computer, a computer network, or other programmable device. The computer instructions may be stored in a computer-readable storage medium or transferred from one computer-readable storage medium to another computer-readable storage medium. For example, the computer instructions may be transferred from a website site, computer, server or data center to another website site, computer, server, or data center, through a wire mode (e.g., coaxial cable, fiber optic, digital subscriber line (DSL)), or a wireless mode (e.g., infrared, wireless, microwave, etc). The computer-readable storage medium may be any available media that may be accessed by a computer or a data storage device such as a server, or a data center integrated by one or more available media. The available medium may be a magnetic medium (e.g., a floppy disk, a hard disk, a magnetic tape), an optical medium (e.g., a DVD), or a semiconductor medium such as a solid state disk (SSD), or the like.

The objects, technical solutions, and benefits of implementations of the present application are described in detail in the foregoing specific implementations. It should be understood that the foregoing descriptions are merely specific implementations of the present application, but are not intended to limit the protection scope of the implementations of the present application. Any modification, equivalent replacement, or improvement based on technical solutions of implementations of the present application shall fall into the protection scope of implementations of the present application.

What we claim is:

1. A bearer configuration method, comprising:
configuring, by a first network device, a bearer sequence number for at least one first bearer of a terminal, wherein the at least one first bearer and at least one second bearer configured by the first network device for the terminal support a data duplication function, the first network device and a second network device provide dual connectivity (DC) transmission for the terminal, and a difference between a first bit to which a bearer sequence number of each of the at least one first bearer is mapped and a most significant bit is greater than a difference between a second bit to which a bearer sequence number of each of the at least one second bearer is mapped and the most significant bit; wherein the bearer sequence number of each of the at least one first bearer belongs to a first sequence number set, the bearer sequence number of each of the at least one second bearer belongs to a second sequence number set, and a range of the first sequence number set is not the same as a range of the second sequence number set.

2. The method of claim 1, wherein the at least one first bearer is associated with the first network device, and the at least one second bearer is associated with the first network device and the second network device.

3. The method of claim 1, wherein the at least one first bearer comprises a Master Cell Group (MCG) bearer.

4. The method of claim 1, wherein the at least one second bearer comprises at least one of: a Secondary Cell Group (SCG) bearer, a Master Cell Group (MCG) split bearer, and a SCG split bearer.

5. The method of claim 1, wherein the first bit to which the at least one first bearer is mapped and the second bit to which the at least one second bearer is mapped are successive bits.

6. The method of claim 1, wherein the method further comprises:
notifying, by the first network device, the terminal of the bearer sequence number of the at least one first bearer.

7. The method of claim 2, wherein the first bit to which the at least one first bearer is mapped and the second bit to which the at least one second bearer is mapped are successive bits.

8. The method of claim 1, wherein the first bit or the second bit is a bit in a Medium Access Control (MAC) Control Element (CE) signaling, used for activating a corresponding bearer.

9. The method of claim 6, wherein notifying, by the first network device, the terminal of the bearer sequence number of the at least one first bearer, comprises:
sending, by the first network device, configuration information to the terminal, wherein the configuration information is used for indicating the bearer sequence number of the at least one first bearer.

10. A bearer configuration method, comprising:
receiving, by a terminal, configuration information from a first network device; wherein the configuration information is used for indicating a bearer sequence number configured by the first network device for at least one first bearer, the at least one first bearer and at least one second bearer configured by the first network device for the terminal support a data duplication function, the first network device and a second network device provide dual connectivity (DC) transmission for the terminal, and a difference between a first bit to which a bearer sequence number of each of the at least one first bearer is mapped and a most significant bit is greater than a difference between a second bit to which a bearer sequence number of each of the at least one second bearer is mapped and the most significant bit; wherein the bearer sequence number of each of the at least one first bearer belongs to a first sequence number set, the bearer sequence number of each of the at least one second bearer belongs to a second sequence number set, and a range of the first sequence number set is not the same as a range of the second sequence number set.

11. The method of claim 10, wherein the at least one first bearer is associated with the first network device, and the at least one second bearer is associated with the first network device and the second network device.

12. The method of claim 10, wherein the at least one first bearer comprises a Master Cell Group (MCG) bearer.

13. The method of claim 10, wherein the at least one second bearer comprises at least one of: a Secondary Cell Group (SCG) bearer, a Master Cell Group (MCG) split bearer, and a SCG split bearer.

14. The method of claim 10, wherein the one first bit to which the at least one first bearer is mapped and the second bit to which the at least one second bearer is mapped are successive bits.

15. The method of claim 10, wherein the first bit or the second bit is a bit in a Medium Access Control (MAC) Control Element (CE) signaling, used for activating a corresponding bearer.

16. The method of claim 11, wherein the at least one first bearer comprises a Master Cell Group (MCG) bearer.

17. The method of claim 11, wherein the one first bit to which the at least one first bearer is mapped and the one second bit to which the at least one second bearer is mapped are successive bits.

18. A terminal, comprising: a processor, a memory, a communication interface, and one or more programs, wherein the one or more programs are stored in the memory and configured to be executed by the processor, and the program comprises instructions for performing acts of: configuration information from a first network device; wherein the configuration information is used for indicating a bearer sequence number configured by the first network device for at least one first bearer, the at least one first bearer and at least one second bearer configured by the first network device for the terminal support a data duplication function, the first network device and a second network device provide dual connectivity (DC) transmission for the terminal, and a difference between a first bit to which a bearer sequence number of each of the at least one first bearer is mapped and a most significant bit is greater than a difference between a second bit to which a bearer sequence number of each of the at least one second bearer is mapped and the most significant bit;

wherein the bearer sequence number of each of the at least one first bearer belongs to a first sequence number set, the bearer sequence number of each of the at least one second bearer belongs to a second sequence number set, and a range of the first sequence number set is not the same as a range of the second sequence number set.

* * * * *